Figure 1:
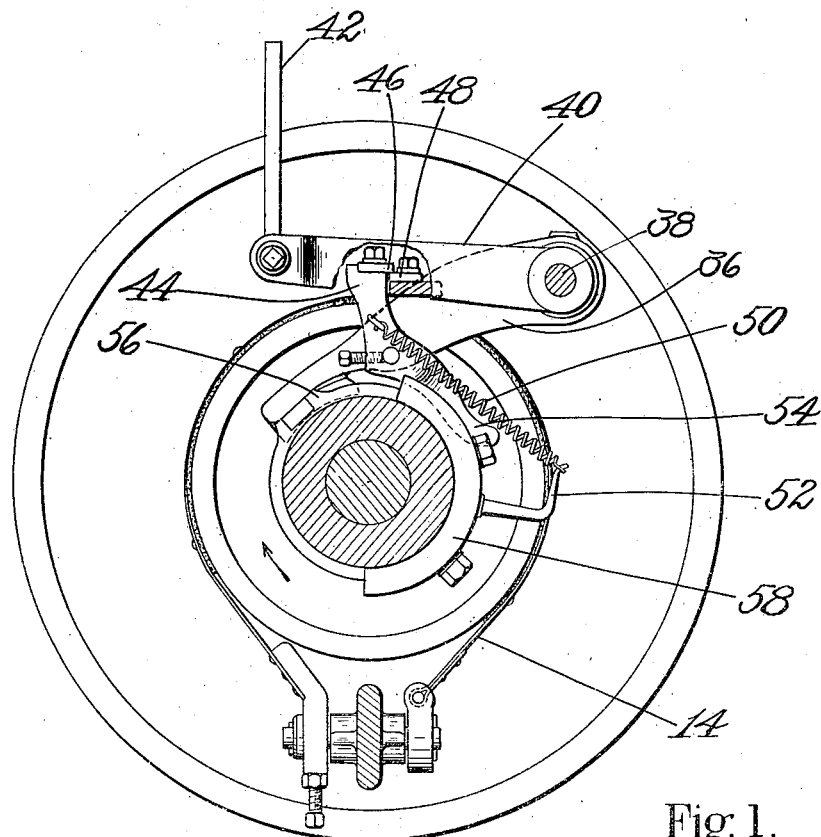

A. BATES.
CLUTCH.
APPLICATION FILED JULY 11, 1908.

1,011,903. Patented Dec. 19, 1911.

WITNESSES_
Elizabeth C. Coupe
Edith C. Holbrook

INVENTOR_
Arthur Bates
By his Attorney,
Nelson N. Howard

UNITED STATES PATENT OFFICE.

ARTHUR BATES, OF LEICESTER, ENGLAND, ASSIGNOR TO UNITED SHOE MACHINERY COMPANY, OF BOSTON, MASSACHUSETTS, A CORPORATION OF NEW JERSEY.

CLUTCH.

1,011,903.  Specification of Letters Patent.  Patented Dec. 19, 1911.

Application filed July 11, 1908. Serial No. 443,060.

*To all whom it may concern:*

Be it known that I, ARTHUR BATES, a subject of the King of England, residing at Leicester, in the county of Leicester, England, have invented certain Improvements in Clutches, of which the following description, in connection with the accompanying drawings, is a specification, like reference characters on the drawings indicating like parts in the several figures.

This invention relates to clutches and especially to clutches of that type by which a moving part may be frictionally connected with a stationary part in order to impart movement to the latter.

In particular the invention relates to a clutch in which the friction by which the movement of the movable part is transmitted to the stationary part is produced by the engagement of two substantially circular parts, one of which surrounds the circumference of the other, and in which the diameter of one of the circular parts may be varied in such manner that the two parts may be brought into and out of engagement throughout a substantial portion of their adjacent circular surfaces.

An object of the present invention is to improve the construction of clutches of this last-named type and especially to provide improved means for effecting the clutch operating variations in the diameter of one of the aforementioned circular parts.

In its illustrated preferred embodiment the invention comprises an improved clutch of the type generally designated by the term "expanding ring clutch." In this type of clutch the clutch member, of which the diameter may be varied, comprises usually and preferably a split ring carried by the stationary part to be clutched, a circular flange upon the movable part to be clutched preferably surrounding the said split ring. Spreading of the parts of the split ring away from each other serves to increase its diameter and thereby to bring it into circumferential engagement with the flange upon the movable part to be clutched.

A further object of the invention is to provide improved means for effecting relative movement of the parts of the split ring of the aforementioned clutch, said means being preferably constructed to effect simultaneous and equal movements of the parts of the ring away from each other and to permit simultaneous and equal movements of the parts of the ring toward each other under the action of the elasticity of the spring material of which such rings are usually and preferably composed, although it will be understood that the invention is not limited to the provision of means for effecting a relative movement of the parts of the ring in a single direction. The provision of means for effecting such simultaneous and equal movements of the parts of the ring away from each other permits the ready construction and assembled of a clutch in which the expanding ring engages its surrounding flange throughout substantially its whole circumference.

Another object of the invention is to provide means for varying the diameter of the split ring of a clutch of the type herein illustrated which is readily adjustable to compensate for wear of the frictional members or to compensate for variations due to changes of temperature and to provide means for effecting such adjustment in such manner that the expanding means will still operate to effect simultaneous and equal movements of the parts of the ring away from each other.

Preferably the means for expanding the ring of the clutch of the type herein illustrated is carried by the ring itself and an important object of the invention is the provision of means for actuating said expanding means. In the preferred form of the invention the said means for actuating the expanding means is arranged to be moved longitudinally of the axis of rotation of the parts to be clutched whereby the clutch may be conveniently modified into a one rotation clutch.

Another important object of the invention is the provision of means for effecting a movement away from each other of the parts of a split ring of a clutch of the type herein illustrated which is so constructed and arranged that separating thrusts will be simultaneously imparted to the two parts and that the counter thrust caused by the action of either part in tending to move under it own elasticity against the thrust imparted by said means will be transmitted directly and preferably solely to the other part of said ring, so that thereby the expanded ring may be maintained rigidly in its expanded condition. As herein illustrated the means for expanding the split ring comprises preferably a member carried by said ring and in operative engagement with the two parts thereof, said member being so constructed and arranged that upon being turned about its axis it effects a separation of the parts of said ring. The illustrated member is screw-threaded and the threads coöperate with threads on the ring in such manner that turning of the member effects a relative movement of the member and ring, and a movement of the parts of the ring toward or away from each other is thus brought about. Preferably, as hereinbefore suggested, the movement of the parts of the ring toward each other is brought about by the tendency of the ring to contract under it own elasticity and therefore in the illustrated preferred embodiment the member has screw-threaded engagement with one part only of the expanding ring, the end of said member which is not threaded having pivotal engagement with the other part of said ring. The illustrated construction in which only one end of the member which serves to expand the ring is threaded has a further advantage in that it permits the provision of convenient means for effecting an adjustment of the expanding means to compensate for wear or for changes due to variation in temperature. In the illustrated construction the adjusting means comprises an adjustable bearing for the end of the screw-threaded member which has pivotal engagement with one part of the ring.

As hereinbefore suggested the means for actuating the expanding means is preferably arranged to be moved longitudinally of the axis of rotation of the clutch members and in its illustrated embodiment this means comprises a pin or plunger mounted to slide in the stationary clutch member and in operative engagement with an arm upon the screw-threaded member which expands the split ring. The pin or plunger is preferably spring-pressed in the direction to operate the expanding means, and is arranged to be held in inoperative position by any suitable clutch tripping means, a convenient construction of such tripping means comprising a wedge-shaped member adapted to engage a projection upon the pin or plunger and cause the said pin or plunger to be moved against the tension of its spring by the longitudinal component of force produced by its rotation with the clutch member over the inclined surface of the wedge. By locating the wedge member at a particular point in the rotation of the pin or plunger with the clutch member, the clutch member may always be stopped in the same angular position.

Preferably the clutch tripping means is associated with mechanism for moving it out of clutch tripping relation to the plunger which is so constructed and arranged that the said tripping means will again come into clutch tripping relation to the plunger before the plunger has made a complete rotation with its associated clutch member, and an important object of the invention is the provision of improved means for insuring the just-described operation of the clutch tripping means. In its illustrated embodiment the means for operating the clutch tripping means in such manner that the clutched parts will make only a single rotation before being again unclutched comprises two levers arranged to be locked together, one of said levers having formed upon it the plunger operating wedge. The means for locking the levers together so that they may be moved together comprises a latch arranged to be unlatched shortly after the clutch members begin to rotate together, when the clutch tripping wedge has been moved out of its clutch tripping relation to the aforementioned plunger. When it is desired to operate the clutch the lever which carries the clutch releasing wedge may be lifted through its connection with the other lever, means being preferably provided by which the operator may conveniently raise this last-mentioned lever. As above suggested, the means, which locks the levers together so that the wedge carrying lever may be lifted by the one controlled by the operator, is so arranged that the levers are unlocked after the clutched parts start to rotate. Preferably means is provided for automatically locking the said levers together again after the means under the control of the operator has been released by him.

Other objects of the invention will be apparent from a consideration of the construction and mode of operation of the clutch illustrated in the accompanying drawings, in which,—

Figures 2, 3, 4:
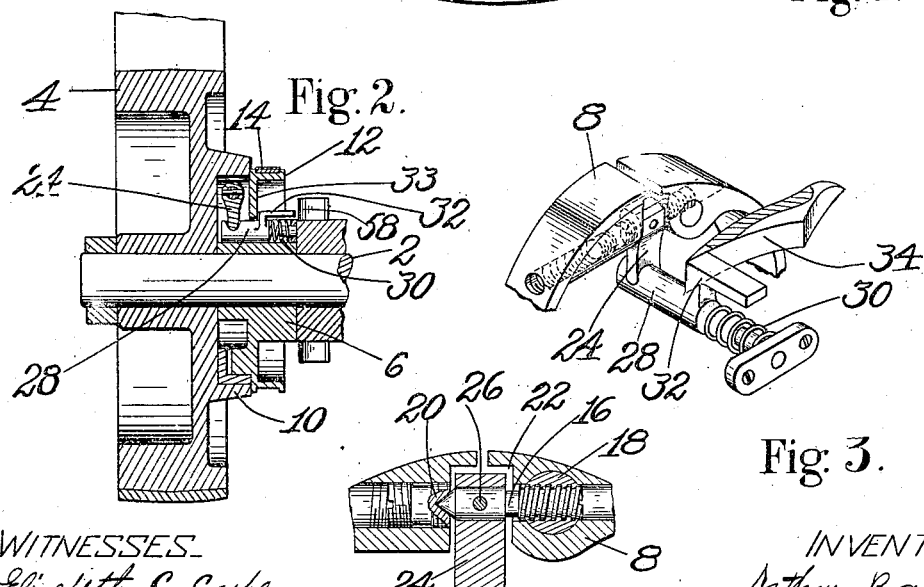

Figure 1 is an end view of the clutch, the shaft to which the normally stationary clutch member is attached and a portion of said member being shown in section; Fig. 2 is a vertical longitudinal section through said clutch; Fig. 3 is a detail perspective of the mechanism through which the diameter of the split ring is varied, and Fig. 4 is a detail section illustrating especially the construction of the means for expanding the split ring.

Loosely mounted upon the shaft 2 to which motion is to be imparted is a pulley 4 connected to any suitable source of power. Rigidly attached to the shaft 2 is the stationary clutch member 6 which carries a split ring or expanding ring 8, a flange 10 upon the pulley 4 surrounding this ring. The clutch member 6 has formed upon it a flange 12 which provides a braking surface for the application of a band brake 14 of any suitable or usual construction. The ring 8 is split, as shown, at its upper part and is normally contracted in diameter and circumference, so that it does not contact with the inner surface of the surrounding flange 10 upon the pulley 4. The ring is also preferably constructed of such material that when expanded so that it contacts with the inner surface of the flange 10 and again released it will quickly return under its own elasticity to its normal non-contacting relation to said flange.

The means for expanding the ring 8, or spreading its two parts, so that it will come into frictional engagement with the inner surface of the flange 10 comprises preferably a screw-threaded member 16 threaded into a cylindrical block 18 inserted in an opening bored transversely through the ring 8 and adapted to turn somewhat in said opening with the member 16 to prevent binding as the parts of the ring are spread apart. The member 16 extends across the split in the ring and pivotally engages a bearing in the other part of said ring, said bearing being formed in one end of a bearing block 20 threaded into said part of the ring 8 and lying normally in axial alinement with the member 16.

The two parts of the ring 8 are cut away in the region of the split to form a recess 22 into which extends a depending arm 24 rigidly attached to the member 16. For convenience in assembling, the attachment of the arm 24 to the member 16 is effected by means of a pin 26 passed through openings in the arm and said member. The arm may be centered or approximately centered in the recess 22 by turning the member 16 in its block 18 before the arm is pinned to said member and by adjusting the bearing block 20. It will be noted that the screw-threaded end of the member 16 has a kerf for the reception of a screw driver for convenience in effecting this adjustment, and that a similar kerf is provided in the outer end of the bearing block 20. Inasmuch as the turning of the member 16 to effect an expansion or contraction of the ring 8 causes a variation in the distance between one side of this member and the side of the recess 22 the initial adjustment need not necessarily be such that the arm 24 is exactly centered in said recess. Turning of the screw 16 to bring about an expansion or contraction of the ring 8 is effected through the arm 24, and in the illustrated construction the means for transmitting motion to the arm 24 comprises a pin or plunger 28 slidably mounted in the stationary clutch member 6 and pressed by a spring 30 normally in a direction to cause the arm 24 and screw 16 to expand the ring 8. The plunger 28 has formed upon it a projection 32 which lies upon the opposite side of the portion of the member 6 upon which the flange 12 is formed with respect to the arm 24, the spring 30 tending normally to press the projection 32 into engagement with the face 33 of the said portion of the clutch member 6. When the parts are in the position shown in Fig. 2, the ring 8 is expanded into frictional engagement with the flange 10 and the parts are clutched together so that rotating movement is imparted to the shaft 2 through the pulley 4. Unclutching of the parts is effected in the illustrated construction through a wedge 34 formed upon one end of a lever 36 pivoted at 38 upon a stationary part of the machine with which the clutch is associated. The wedge 34 is arranged, when in its lowermost position, to enter between the face 33 of the clutch member 6 and the projection 32 upon the plunger 28 and as the plunger 28 rotates with the clutch member 6 to cause it to be moved by the component of force parallel to the axis of rotation against its spring 30, thereby turning the member 16 through the arm 24 and permitting the spring 8 to contract under its own elasticity. Engagement of the wedge 34 with the projection 32 to bring about a movement of the plunger 28 longitudinally of the axis of rotation is illustrated especially in Fig. 3 of the drawings. The wedge 34 is preferably normally in the position shown in Fig. 3 in which position the parts of the clutch are held out of clutching relation to each other. When it is desired to bring about a clutching of the parts to effect a rotation of the shaft 2 through the pulley 4, the wedge 34 is lifted out of operative relation to the projection 32, and in the illustrated construction the means for lifting the wedge 34 comprises a lever 40, also pivoted at 38 on the frame of the machine with which the clutch is associated, said lever 40 being connected by a rod 42 to means under the control of the operator by which it may be lifted and being normally locked to the wedge carrying lever 36 by a latch comprising a latch member 44 pivoted upon the lever 36 and carrying the catch plate 46 which projects normally over a similar catch plate 48 upon the lever 40. The latch member 44 is yieldingly pressed toward the catch plate 48 by a spring 50 connected at one end to said member above its pivot on the lever 36 and at its other end to a hook 52 upon the frame of the machine with which the clutch is associated. The latch member 44 is extended upon the other side of its pivot from the catch plate 46 to form a tail 54 arranged to be engaged by a projection 56 upon the clutch member 6 when it begins to rotate after the parts have been clutched together, the illustrated projection being formed upon one wall of the guide for the pin or plunger 28. The engagement of the projection 56 with the tail 54 of the latch member 44 operates to move the catch plate 46 out of its latching position above the catch plate 48, thus leaving the wedge carrying lever free to drop under the action of gravity and under the pull of the spring 50. Dropping of the lever 36 brings the wedge 34 into position to engage the projection 32 upon the plunger 28 when the clutched parts have rotated so that the projection 32 is brought into operative relation to the wedge 34. The plunger 28 will thus be moved against the tension of its spring 30 and the parts will be unclutched at the end of a single rotation.

It will be noted that the clutching of the parts will be effected very quickly since the actuation of the means for expanding the split ring 8 is effected by the release of the stored-up energy in the spring 30, as soon as the wedge 34 is moved out of its clutch releasing relation to the projection 32. It will be noted, also that both parts of the split ring 8 are moved as the screw 16 is turned by the arm 24, and that the movements of these parts away from each other will be simultaneous and equal. Moreover it will be seen that the illustrated construction of means for expanding the split ring has many advantages over the ordinary constructions employed for this purpose, since the counter thrust caused by the application of force to one part of the ring is transmitted directly to the other part and therefore the movement of the parts away from each other is positively insured. It will be seen also that the provision of means for expanding the split ring which is so constructed that the parts of the ring move simultaneously and equally away from each other permits such an initial adjustment of the two frictional surfaces that their relative movement into frictional contact effects their engagement throughout substantially the greater portion of their extent.

In the event that the plunger 28 should not be pressed by its spring 30 sufficiently far when released to cause an effective clutching of the two clutch members, a cam plate 58 has been provided upon the frame of the machine which serves to force the plunger 28 to its inner limit of movement provided it has been moved initially by the spring 30 far enough to cause such a clutching of the two clutch members that they begin to rotate together. This prevents slipping of the clutch parts over each other after the mechanism clutched to the constantly moving pulley 4 has begun to perform its work and therefore offers resistance to the driving action of said pulley.

Having described my invention, what I claim as new and desire to secure by Letters Patent of the United States is:—

1. In apparatus of the class described, the combination with coöperating clutch members comprising a split ring, of means for expanding said ring to effect a clutching of said members comprising a screw threaded into said ring and extending between the two parts thereof, and means to turn said screw comprising a spring-pressed plunger movable parallel to the axis of rotation of the clutch members and arranged to revolve about said axis, and means automatically moved into the path of said plunger to engage and move it into inoperative position as it completes one revolution.

2. In apparatus of the class described, the combination with coöperating clutch members, one of which comprises a split ring arranged to be expanded into engagement with the other, of means for expanding said ring comprising a screw threaded into said ring and arranged to operate simultaneously upon the two parts thereof and means to turn said screw comprising a spring-pressed plunger arranged to revolve about the axis of rotation of the clutch members, a projection upon said plunger and a wedge automatically brought into engagement with said projection and constructed to move said plunger into inoperative position as it completes one revolution.

3. In apparatus of the class described, the combination with coöperating clutch members comprising a split ring, of means for expanding said ring to effect a clutching of said members comprising a spring-pressed plunger movable parallel to the axis of rotation of the clutch members and arranged to revolve about said axis and clutch controlling means comprising two levers turning about a common axis, means for connecting said levers together including a latch arranged to be unlatched as the clutch members begin to rotate together and means carried by one of said levers constructed and arranged to hold said plunger normally in inoperative position.

4. In apparatus of the class described, the combination with coöperating clutch members including a split ring, of means for varying the diameter of said ring to effect the clutching of said members comprising a screw threaded into the ring upon one side of said split and having a conical bearing against the ring upon the other side of said split, provision being made for independent adjustment of said screw and said conical bearing when in assembled relation to each other.

5. In apparatus of the class described, the combination with coöperating clutch members including a split ring, of means for varying the diameter of said ring to effect the clutching of said members comprising a screw threaded into said ring upon one side of said split and an adjustable conical bearing in said ring upon the other side of said split with which said screw has pivotal engagement.

6. In apparatus of the class described, the combination with coöperating clutch members including a split ring, of means for varying the diameter of said ring to effect the clutching of said members comprising a screw; a cylindrical block mounted in said ring upon one side of the split therein into which said screw is threaded, the axis of said block lying transverse to the axis of said screw, and a conical bearing in said ring upon the other side of the split therein with which said screw has pivotal engagement, provision being made for independent adjustment of said screw and said conical bearing when in assembled relation to each other.

7. In apparatus of the class described, the combination with coöperating clutch members one of which comprises a split ring, of means for varying the diameter of said ring to effect the clutching of said members comprising a screw threaded into said ring and extending across the split therein, an arm by which said screw may be turned to effect a relative movement of the parts of said ring, means for operating said arm comprising a spring-pressed plunger operatively connected to said arm and a wedge for engaging said plunger and holding said arm in inoperative position.

8. In apparatus of the class described, the combination with coöperating clutch members one of which comprises a split ring, of means for varying the diameter of said ring to effect the clutching of said members comprising a screw threaded into said ring and extending across the split therein, an arm by which said screw may be turned to effect a relative movement of the parts of said ring, means traveling about the axis of rotation of the clutch for operating said arm tending normally to turn said arm in the direction to effect a clutching of said clutch members, and means for engaging and preventing the operation of said last-named means at a particular point in its path of travel.

9. In apparatus of the class described, the combination with coöperating clutch members including a split ring, of means for varying the diameter of said ring to effect the clutching of said members comprising a screw threaded into said ring and extending across the split therein, means for turning said screw tending normally to turn said screw in the direction to effect the clutching of said members, means for holding said last-named means out of operation and means for insuring a complete operation of said screw turning means when released.

10. In apparatus of the class described, the combination with coöperating clutch members comprising a split ring, of means for expanding said ring to effect a clutching of said members comprising a screw threaded into said ring and extending across the split therein, means for turning said screw tending normally to turn said screw in the direction to effect the clutching of said members, means for holding said last-named means out of operation and tripping means for said holding means including a latch arranged to be unlatched as said clutch members begin to rotate together.

11. In apparatus of the class described, the combination with coöperating clutch members and means for effecting a clutching thereof, of a wedge for holding said clutch operating means out of operation, and means for lifting said wedge out of operative relation to said clutch operating means comprising two levers having a common pivot and a latch by which said levers are connected together for wedge lifting movement arranged to be unlatched as said clutch parts begin to rotate whereby said wedge is returned automatically into operative relation to said clutch operating means.

12. In apparatus of the class described, the combination with coöperating clutch members comprising a split ring, of means for operating the clutch constituted by said members comprising two levers turning about a common axis, and means for connecting said levers together including a latch arranged to be unlatched as the clutch members begin to rotate together; one of said levers being constructed and arranged to hold the clutch normally inoperative and means associated with one of said clutch members for unlatching said latch.

13. In apparatus of the class described, the combination with coöperating clutch members comprising a split ring, of means for operating the clutch constituted by said members comprising two levers turning about a common axis, a pivoted latch member carried by one of said levers and arranged to engage a part of the other of said levers to lock said levers together, a latch tripping cam carried by the clutch and a tail upon said latch member arranged to engage said cam whereby said levers are disconnected when the clutch members begin to rotate together.

In testimony whereof I have signed my name to this specification in the presence of two subscribing witnesses.

ARTHUR BATES.

Witnesses:
GRACE HOLMES,
ARTHUR ERNEST JERRAM.